M. C. LEE.

Toys,

No. 151,542. Patented June 2, 1874.

WITNESSES:

Chas. Nida

[signature]

INVENTOR:

M. C. Lee

BY Munn & Co

ATTORNEYS.

AM. PHOTO-LITHOGRAPHIC Co. N.Y. (OSBORNE'S PROCESS.)

UNITED STATES PATENT OFFICE.

MORTIMER C. LEE, OF NEW YORK, N. Y.

IMPROVEMENT IN TOYS.

Specification forming part of Letters Patent No. 151,542, dated June 2, 1874; application filed November 15, 1873.

*To all whom it may concern:*

Be it known that I, MORTIMER C. LEE, of the city, county, and State of New York, have invented a new and useful Improvement in Child's Toy, of which the following is a specification:

The object of this invention is to provide means whereby young children may gratify to some extent their desire to drive horses; and it consists in a toy cart with a figure of a horse's head and neck (one or more) attached to the axle thereof, propelled by means of a tongue, and guided by means of reins, the construction and arrangement of parts being hereinafter more fully described.

Figure 1:
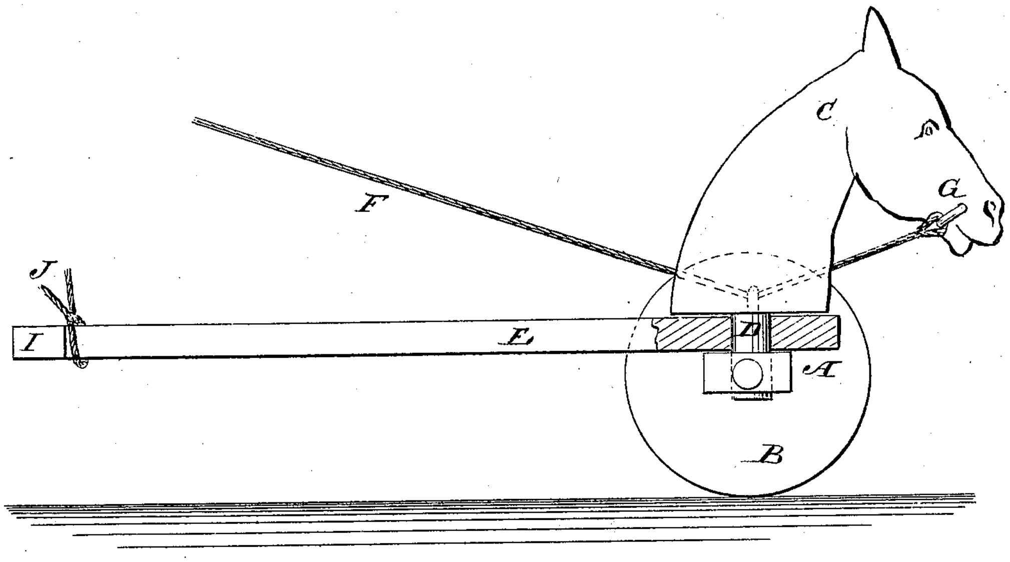
Figure 2:
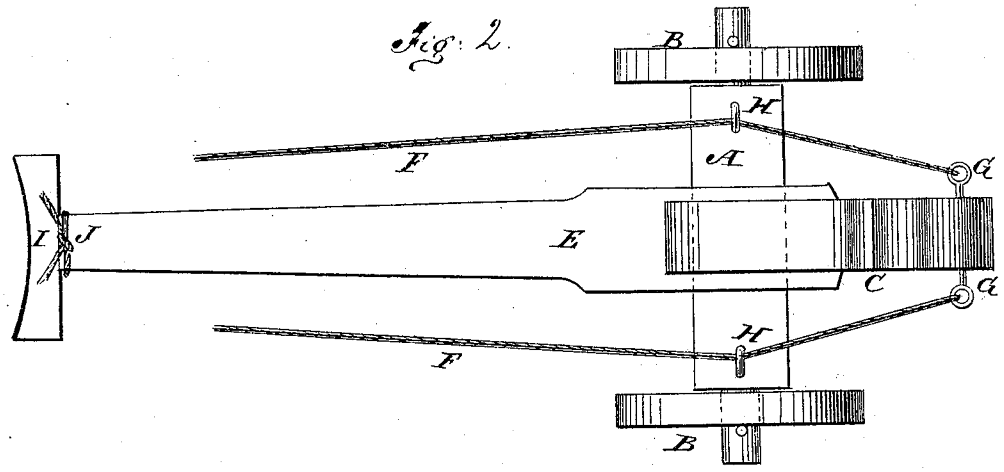

In the accompanying drawing, Figure 1 is a side view, partly in section. Fig. 2 is a plan view.

Similar letters of reference indicate corresponding parts.

A represents the axle. B B are the wheels. C is the horse's head, which is rigidly connected with the axle by the round pin D. E is the tongue, by means of which the wheels are propelled. This tongue is connected with the axle and head by the pin D, which passes loosely through said tongue, but is fastened securely to the axle A. F are the reins or lines attached to the head by means of bit-eyes G. From the bit-eyes the lines pass through rings or eyes H H in the axle, for the purpose of giving the driver greater purchase in turning the head and wheels. This purchase may be obtained by extending the bit-eyes out from the head laterally, or both plans may be adopted, as seen in Fig. 2. I is a breast-piece, which bears against the person of the driver, with a strap or cord, J, attached to the end of the tongue to go around the neck. In this manner the tongue is held up while the driver runs and guides his horse. A pull upon either line changes the direction, and the effect is very similar to that of guiding a live horse, which makes the toy extremely interesting to the juvenile driver. A carriage of four wheels may be employed, having a body, and two horses' heads instead of one may be attached to the axle, and instead of one tongue, as shown, there may be two tongues, or one broad one, which may serve as a bottom for a box or carriage-body. In such a case the tongues or bottom would be attached to the axle by a king-bolt, or with slots instead of round holes, to allow the pins play when the axle turns.

Having thus described my invention, I claim as new and desire to secure by Letters Patent—

1. A child's toy, consisting of the axle and wheels A B, with one or more horses' heads attached thereto, arranged as described, so that the axle and wheels will be turned by pulling reins attached to the horses' heads, substantially as shown and described.

2. An axle and wheels, having a figure of a horse's head or similar device attached thereto, in combination with a tongue and reins, substantially as described.

3. The neck strap or cord J and breast-piece I, in combination with the tongue E, axle and wheels A B, and horse's head C, as and for the purposes described.

MORTIMER C. LEE.

Witnesses:

T. B. MOSHER,

ALEX. F. ROBERTS.